(12) United States Patent  
Nordbruch et al.

(10) Patent No.: US 8,942,880 B2
(45) Date of Patent: Jan. 27, 2015

(54) METHOD AND DEVICE FOR OPERATING A DRIVER ASSISTANCE SYSTEM OF A VEHICLE

(71) Applicants: Stefan Nordbruch, Kornwestheim (DE); Michael Fausten, Asperg (DE)

(72) Inventors: Stefan Nordbruch, Kornwestheim (DE); Michael Fausten, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/011,997

(22) Filed: Aug. 28, 2013

(65) Prior Publication Data

US 2014/0074338 A1  Mar. 13, 2014

(30) Foreign Application Priority Data

Sep. 11, 2012 (DE) .......................... 10 2012 216 038

(51) Int. Cl.  
*G06F 19/00* (2011.01)  
*B62D 15/02* (2006.01)  
*B60W 40/08* (2012.01)

(52) U.S. Cl.  
CPC ........... *B62D 15/0285* (2013.01); *B60W 40/08* (2013.01)  
USPC .................... 701/23; 701/41; 701/45; 701/96; 701/117; 701/469; 340/8.1; 340/436; 340/988; 340/932.2; 477/109; 477/111; 342/457; 382/103; 382/104; 382/105

(58) Field of Classification Search  
CPC ........... G06K 9/00; G06Q 50/30; G08G 1/00; H04N 7/181  
USPC ......... 701/41, 45, 96, 117, 469; 340/8.1, 436, 340/988, 932.2; 477/109, 111; 180/422; 342/457; 74/335; 455/404.1; 33/264; 116/173; 40/593; 382/103, 104, 105; 348/148  
See application file for complete search history.

(56) References Cited

U.S. PATENT DOCUMENTS

| | | | |
|---|---|---|---|
| 8,698,895 B2 * | 4/2014 | Nerayoff et al. ............... 348/148 |
| 8,698,896 B2 * | 4/2014 | Nerayoff et al. ............... 348/148 |
| 2010/0161128 A1 * | 6/2010 | Choi et al. ..................... 700/258 |
| 2012/0188100 A1 * | 7/2012 | Min et al. ..................... 340/932.2 |
| 2013/0231821 A1 * | 9/2013 | Rothoff .......................... 701/23 |
| 2013/0231824 A1 * | 9/2013 | Wilson et al. .................. 701/26 |
| 2014/0039987 A1 * | 2/2014 | Nerayoff et al. ................ 705/13 |
| 2014/0121883 A1 * | 5/2014 | Shen et al. ..................... 701/28 |

FOREIGN PATENT DOCUMENTS

DE      10 2007 046037      4/2009

* cited by examiner

*Primary Examiner* — McDieunel Marc  
(74) *Attorney, Agent, or Firm* — Kenyon & Kenyon LLP

(57) ABSTRACT

A method for operating a driver assistance system of a vehicle is described, together with a corresponding device, a corresponding vehicle, and a corresponding computer program. The driver assistance system is configured to autonomously safely park the vehicle when activated. While the vehicle is traveling, an activation intent for the driver assistance system is detected, whereupon the driver assistance system is activated and the vehicle is autonomously safely parked with the aid of the activated driver assistance system.

18 Claims, 2 Drawing Sheets

METHOD AND DEVICE FOR OPERATING A DRIVER ASSISTANCE SYSTEM OF A VEHICLE

RELATED APPLICATION INFORMATION

The present application claims priority to and the benefit of German patent application no. 10 2012 216 038.8, which was filed in Germany on Sep. 11, 2012, the disclosure of which is incorporated herein by reference.

FIELD OF THE INVENTION

The present invention relates to a method and a device for operating a driver assistance system of a vehicle. Moreover, the present invention relates to a corresponding vehicle and a corresponding computer program.

BACKGROUND INFORMATION

A device is discussed in Published Unexamined German Patent Application DE 10 2007 046 037 B3 for increasing safety in road traffic. The device is configured to detect a state of health of a driver, and when there is a sudden worsening in the state of health, to automatically slowly decelerate the vehicle and drive it to the right side of the roadway.

SUMMARY OF THE INVENTION

An object of the present invention may therefore be regarded as providing an improved method for operating a driver assistance system of a vehicle.

Moreover, the object of the present invention may be regarded as providing a corresponding device for operating a driver assistance system of a vehicle.

Moreover, the object of the present invention may be regarded as providing a corresponding vehicle.

Furthermore, the object of the present invention may be regarded as providing a corresponding computer program.

These objects are achieved by the respective subject matter of the independent claims. Advantageous embodiments are the subject matter of the respective dependent subclaims.

According to one aspect, a method for operating a driver assistance system of a vehicle is provided. The driver assistance system is configured to autonomously safely park the vehicle when the driver assistance system has been activated. While the vehicle is traveling, an activation intent for the driver assistance system is detected, whereupon the driver assistance system is activated and the vehicle is autonomously safely parked with the aid of the activated driver assistance system.

According to another aspect, a device for operating a driver assistance system of a vehicle is provided. The driver assistance system is configured to autonomously safely park the vehicle when activated. The device includes a detector for detecting an activation intent for the driver assistance system. In addition, a control system is provided which is configured to activate the driver assistance system when the activation intent is detected.

According to yet another aspect, a vehicle which includes the device for operating a driver assistance system of a vehicle and the driver assistance system is provided.

According to another aspect, a computer program is provided which includes program code for carrying out the method for operating a driver assistance system of a vehicle when the computer program is executed in a computer.

The present invention thus includes in particular the concept that the driver assistance system may be activated with the aid of an activation intent, so that autonomous safe parking of the vehicle may advantageously be actively initiated. Active initiation of such a driver assistance system is not provided in the related art. The device in DE 10 2007 046 037 B3 is understood to decelerate the vehicle only when the state of health of the driver has severely worsened. However, the driver or another vehicle occupant cannot activate the device on his or her own.

However, the driver or another vehicle occupant him- or herself generally notices that the driver will soon no longer be fit to drive, i.e., will no longer be able to safely drive the vehicle; a sensor system which may be present might not be able to reliably recognize this, so that according to the related art, in this regard automatic deceleration of the vehicle is not yet carried out.

For example, the driver him- or herself may notice that a heart attack or a stroke is imminent. In addition, due to observing the driver, another vehicle occupant may recognize that the driver will very soon be unfit to drive.

However, there is generally not enough time then for the driver to be able to independently continue to reliably drive the vehicle in order to safely park it. However, there is generally still enough time for the driver and/or another vehicle occupant to express an activation intent for activating the driver assistance system. This activation intent is detected, and the driver assistance system is activated and then autonomously safely parks the vehicle.

This also results in a quicker response time. In an emergency, the vehicle is brought into a safe state more quickly by being safely parked.

Within the meaning of the present invention, a vehicle occupant refers in particular to a driver or a passenger, who may be seated, for example, next to or behind the driver, for example on a rear bench or a rear seat. Multiple vehicle occupants may be present. The vehicle occupant who is not the driver may be situated on a rear seat, for example. That means in particular that, regardless of the exact location of the vehicle occupants in the vehicle, each of them, individually or together, may express an activation intent in order to actively initiate the autonomous safe parking of the vehicle.

Within the meaning of the present invention, safe parking refers in particular to an autonomous vehicle control by the driver assistance system in which the vehicle is decelerated to a standstill. In particular, the vehicle is driven to the right or the left side of the roadway. For example, it may be provided that during this time, i.e., while the driver assistance system is safely parking the vehicle, a hazard warning light system of the vehicle is activated in order to signal the critical situation to other road users.

According to one specific embodiment, it may be provided that the driver assistance system is not activated until a confirmation parameter is detected in addition to the detected activation intent.

Thus, a single activation intent is no longer sufficient to activate the driver assistance system. Accidental activation of the driver assistance system is thus advantageously avoided. Otherwise, a driver or another vehicle occupant could mistakenly activate the driver assistance system without intending to do so. However, this could then possibly result in the driver being surprised by the sudden activation of the driver assistance system, and taking an action which did not have a positive effect on vehicle safety or safe driving of the vehicle. Such a critical situation may thus be advantageously avoided, since the original activation intent by the driver and/or another vehicle occupant, for example a front-seat passenger or a vehicle occupant seated on a rear seat, must be explicitly confirmed before the driver assistance system is activated.

By providing a confirmation before the driver assistance system is activated, in addition misuse of the driver assistance system is advantageously made more difficult or even avoided altogether.

According to one specific embodiment, the detection of the confirmation parameter includes a detection of a further activation intent. In particular, this means that in particular the driver and/or another vehicle occupant must explicitly express a second activation intent before the driver assistance system is activated. In this regard it may be provided that the activation intent and the further activation intent are formed in the same way. In particular, it may be provided that the activation intent and the further activation intent are formed in different ways.

According to another specific embodiment, it may be provided that the detection of the confirmation parameter includes measuring a state parameter of a driver of the vehicle. The driver assistance system is activated as a function of the measured state parameter. This means in particular that not just any measured state parameter causes the driver assistance system to be activated. The measured state parameter may be in a predefined parameter range and/or corresponds to a predefined value and/or is less than, less than or equal to, greater than, or greater than or equal to the predefined value in order to activate the driver assistance system. Multiple state parameters may be measured. The multiple state parameters may, for example, be formed in the same way, or in particular in different ways. The statements made with regard to a state parameter and the statements below similarly also apply for the case of multiple measured state parameters.

Within the meaning of the present invention, a state parameter refers in particular to a parameter which may describe a state of the driver. For example, the state of the driver may be a state of health of the driver. For example, a state parameter may be a heart rate, a blood pressure, a body temperature, a moisture content on the skin of the driver, fatigue, intoxication, or attentiveness. A state parameter may in particular be measured with the aid of one or multiple sensors. For example, a state parameter may be a weight distribution of the driver. Thus, in particular the way in which the driver sits on the seat is detected. A driver generally bends sharply to the side or forward onto the steering wheel when he/she is unconscious. However, such a sitting posture generally differs from a normal sitting posture which the driver assumes when driving the vehicle. A state parameter may, for example, be a viewing direction of the driver. Thus, in particular the direction in which the driver gazes or looks is detected. If the driver should no longer gaze or look in the direction of the vehicle windshield or the instrument panel, for example, this is generally an indication that the driver is not concentrating, or is no longer able to safely drive the vehicle.

Thus, in particular it is detected with the aid of the state parameter whether the driver is still able to safely drive the vehicle. If it is determined that the driver is no longer able to safely drive the vehicle, this is in particular a confirmation for the activation intent, so that the driver assistance system is activated.

The expressed activation intent by the driver and/or the other vehicle occupant is now checked in such a way that the state, in particular the state of health, of the driver is detected, and the driver assistance system is activated if the state or state of health is sufficiently poor. This advantageously ensures that the driver, provided that he/she is in fact fit, or once again fit, to drive, may at any time take control or take back control of the vehicle, i.e., the driving task.

A state is classified as sufficiently poor in particular when the measured state parameter is in the predefined parameter range and/or corresponds to the predefined value and/or is less than, less than or equal to, greater than, or greater than or equal to the predefined value.

In another specific embodiment, it may be provided that the driver assistance system is additionally configured to autonomously safely park the vehicle as a function of a measured state parameter and independently of an activation intent, i.e., regardless of whether or not an activation intent has been detected. The statements made previously and below with regard to the state parameter and possible variants apply in particular to the specific embodiment described here. This means in particular that the driver assistance system is additionally configured to not wait for an activation intent by the driver and/or the other vehicle occupant, but instead to autonomously safely park the vehicle as a function of the state parameter, i.e., in particular when the state has been classified as sufficiently poor.

This means in particular that the driver assistance system combines both functions or has both functions, as follows:

1. autonomously safely parking the vehicle when the state of the driver is sufficiently poor, i.e., as a function of the measured state parameter, even if an activation intent and/or a confirmation parameter have/has not been detected, and
2. autonomously safely parking the vehicle when the driver and/or the other vehicle occupant or the other vehicle occupants express(es) an activation intent, i.e., when an activation intent has been detected.

The driver and/or the other vehicle occupant may thus advantageously independently activate the driver assistance system; nevertheless, it is still ensured that the driver assistance system is also activated when the state of the driver is sufficiently poor. In such a state, the driver is generally no longer able to activate the driver assistance system him- or herself with the aid of an activation intent. Thus, on the one hand the driver assistance system is activatable with the aid of an activation intent. On the other hand, the driver assistance system is activatable as a function of the measured state parameter.

According to another specific embodiment, it may be provided that the driver assistance system is not activated until a time interval between a particular point in time at which the activation intent has been detected and a particular point in time at which the confirmation parameter has been detected is less than or less than or equal to a predefined time interval. A clear, simple association of a detected confirmation parameter with the previously detected activation intent is thus advantageously made possible. It is namely also possible that the detected confirmation parameter is a new activation intent, the originally expressed activation intent by the driver or the vehicle occupant having already been forgotten by same or no longer considered to be relevant. If the newly expressed activation intent were now interpreted or classified as a confirmation for the originally expressed activation intent, this could result in confusion on the part of the driver or the other vehicle occupant, since they were generally no longer expecting such a response. This could result in safety-critical actions by the driver or the other vehicle occupant, which could then also adversely affect vehicle safety. However, this may advantageously be avoided due to the presence of the above-mentioned time interval.

According to another specific embodiment, it may be provided that at least one of the steps of detecting the activation intent and of detecting the confirmation parameter includes a recognition of a voice command from a vehicle occupant.

This means in particular that either one of the two steps or both steps includes(s) a recognition of a voice command from a vehicle occupant. This means in particular that the vehicle occupant intends to activate the driver assistance system with the aid of a voice command.

In another specific embodiment, it may be provided that at least one of the steps of detecting the activation intent and of detecting the confirmation parameter includes a recognition of a gesture command from a vehicle occupant. This means in particular that either one of the two steps or both steps includes(s) a recognition of a gesture command from a vehicle occupant. This means in particular that by a gesture, the vehicle occupant intends to signal that the driver assistance system is to be activated.

In another specific embodiment, it may be provided that at least one of the steps of detecting the activation intent and of detecting the confirmation parameter includes a detection of an activation of an operator control or a detection of a command of a command device. This means in particular that either one of the two steps or both steps includes(s) a recognition of an activation of a command device or of an operator control.

Within the meaning of the present invention, a command device or an operator control refers in particular to a device with which a user, in the present case a vehicle occupant in particular, may influence a machine or system, in the present case the driver assistance system in particular. The command device may include, for example, a switch or multiple switches, a button or multiple buttons, or a pedal or multiple pedals. This means in particular that the vehicle occupant, for example the driver, must activate a switch, a button, or a pedal, for example, as the activation intent. Thus, in particular it is detected whether the switch, the button, or the pedal has been activated.

According to another specific embodiment, it may be provided that the driver assistance system is not activated until the particular types of steps of detecting the activation intent and of detecting the confirmation parameter are different from one another. This means, for example, that the activation intent may be a voice command. The confirmation parameter, for example, may then be a state of health of the driver. For example, the activation intent may be an activation of a switch. The confirmation parameter, for example, may then be a voice command.

The present invention is explained in greater detail below with reference to the exemplary embodiments.

DETAILED DESCRIPTION

Figure 1:
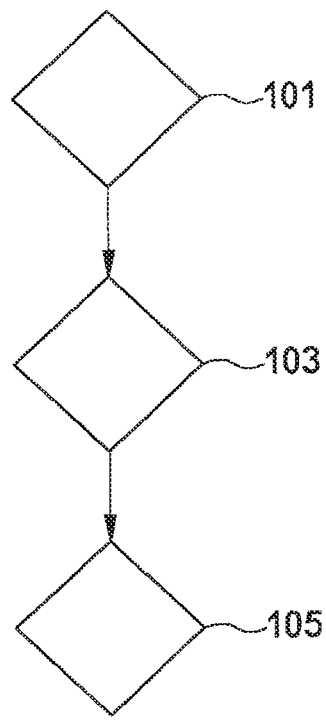
FIG. 1 shows a flow chart of a method for operating a driver assistance system of a vehicle.

FIG. 1 shows a flow chart of a method for operating a driver assistance system of a vehicle.

The driver assistance system is configured to autonomously safely park the vehicle when activated.

While the vehicle is traveling, an activation intent for the driver assistance system is detected according to a step 101 in order to autonomously safely park the vehicle with the aid of the driver assistance system.

A check is made in a step 103 as to whether a confirmation parameter has been detected. If it has been determined according to step 103 that the confirmation parameter has been detected, the driver assistance system is activated in a step 105, so that the driver assistance system then autonomously safely parks the vehicle.

If it has been determined in step 103 that no confirmation parameter has been detected, the driver assistance system is not activated, and the method terminates.

In one specific embodiment not shown, it may be provided that step 103 is omitted. Thus, the activation intent per se is sufficient to activate the driver assistance system according to step 105, and the driver assistance system then safely parks the vehicle.

Figure 2:
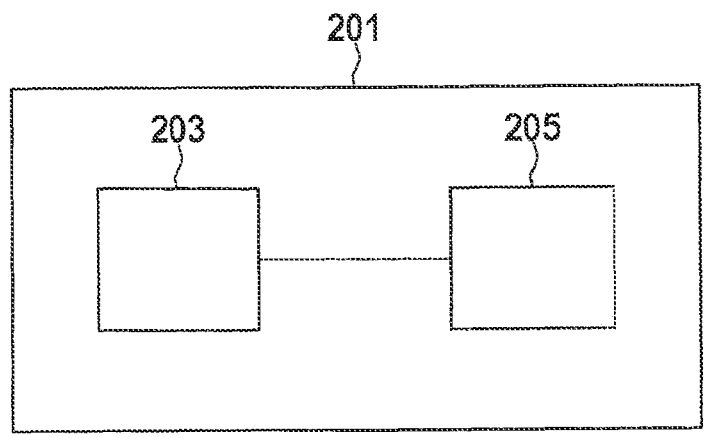
FIG. 2 shows a device for operating a driver assistance system of a vehicle.

FIG. 2 shows a device 201 for operating a driver assistance system of a vehicle.

The driver assistance system is configured to autonomously safely park the vehicle when activated.

Device 201 includes a detection device 203 for detecting an activation intent for the driver assistance system and for detecting a confirmation parameter. In addition, a control system 205 is provided, which is configured to activate the driver assistance system only when the activation intent as well as the confirmation parameter have been detected.

As the result of providing that the driver assistance system is activated only when a confirmation parameter has been detected in addition to the activation intent, accidental activation or misuse of the driver assistance system may advantageously be prevented.

In one specific embodiment not shown, it may be provided that control system 205 is configured to activate the driver assistance system when the activation intent is detected, regardless of whether or not a confirmation parameter has also been detected.

Figure 3:
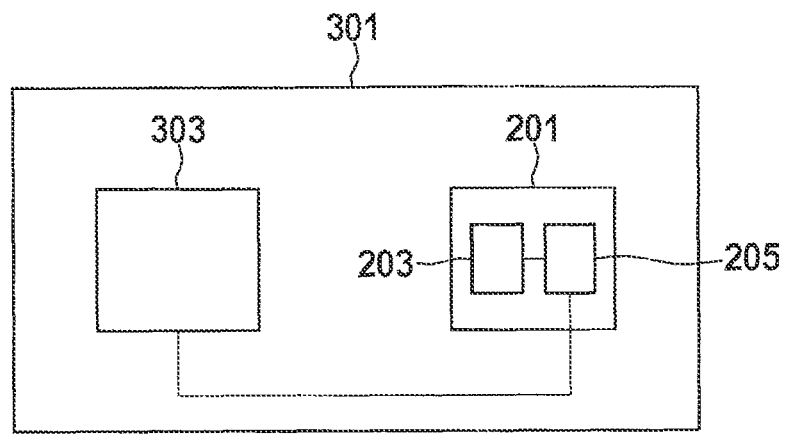
FIG. 3 shows a vehicle.

FIG. 3 shows a vehicle 301.

Vehicle 301 includes device 201 according to FIG. 2. In addition, vehicle 301 includes a driver assistance system 303 which is configured to autonomously safely park vehicle 301 when activated.

Figure 4:
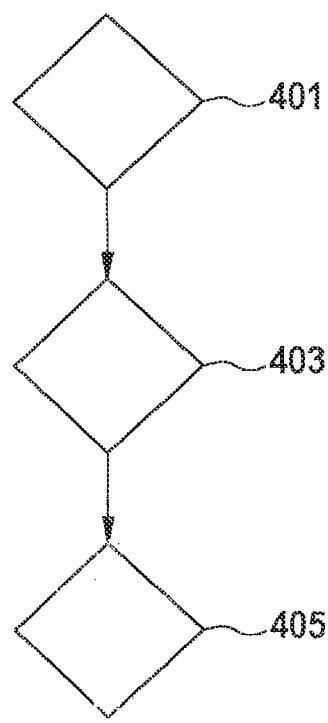
FIG. 4 shows a flow chart of another method for operating a driver assistance system of a vehicle.

FIG. 4 shows a flow chart of another method for operating a driver assistance system of a vehicle.

The driver assistance system is configured to autonomously safely park the vehicle when activated.

A switch activation by a vehicle occupant, for example the driver, as an activation intent for activating the driver assistance system is detected according to a step 401.

A state parameter, for example a state of health parameter describing the state of health of the driver of the vehicle, is detected according to a step 403. In addition, a check is made in step 403 as to whether the detected or measured state parameter is within a predefined parameter interval and/or corresponds to a predefined parameter and/or is greater than, greater than or equal to, less than, or less than or equal to the predefined parameter.

If this is the case, the detected or measured state parameter is defined or classified as a confirmation parameter, so that the driver assistance system is activated according to a step 405. The driver assistance system thus autonomously controls the vehicle in order to safely park it.

However, if it is determined in step 403 that the measured or detected state parameter is not within the predefined interval or does not correspond to the predefined parameter or is not greater than, greater than or equal to, less than, or less than or equal to the predefined parameter, the detected state parameter is not regarded or defined or classified as a confirmation parameter, and the driver assistance system is not activated.

This means in particular that the activation intent, i.e., in the present case the switch activation in particular, is ignored.

In one specific embodiment not shown, it may be provided that, instead of a state parameter, a further activation intent must be detected in step 403, so that the driver assistance system is activated according to step 405. It may be provided that the original switch must be activated once again in order to confirm the original activation intent.

In other specific embodiments not shown, the activation intent or the further activation intent may be a gesture command or a voice command as confirmation for the original activation intent. For example, the driver may utter a voice command as the activation intent, and make a gesture command as confirmation.

In summary, the present invention thus includes in particular the concept of allowing an intentional activation of a driver assistance system by the driver or another vehicle occupant for safely parking the vehicle. The driver or the other vehicle occupant may thus advantageously independently activate the driver assistance system to allow autonomous safe parking of the vehicle to be carried out with the aid of the driver assistance system. It may be provided that before the driver assistance system is activated, the activation intent must initially be confirmed in order to autonomously safely park the vehicle upon positive confirmation. The driver assistance system may have an activation as a function of a detected state parameter as a base function without an activation intent also having to be detected.

What is claimed is:

1. A method for operating a driver assistance system of a vehicle, the driver assistance system being configured to autonomously safely park the vehicle when activated, the method comprising:
    detecting, by a detection device and while the vehicle is traveling, an activation intent for the driver assistance system;
    activating, after there is a detection, the driver assistance system; and
    autonomously safely parking the vehicle with the aid of the activated driver assistance system.

2. A method for operating a driver assistance system of a vehicle, the driver assistance system being configured to autonomously safely park the vehicle when activated, the method comprising:
    detecting, by a detection device and while the vehicle is traveling, an activation intent for the driver assistance system;
    activating, after there is a detection, the driver assistance system; and
    autonomously safely parking the vehicle with the aid of the activated driver assistance system,
    wherein the driver assistance system is not activated until a confirmation parameter is detected in addition to the detected activation intent.

3. The method of claim 2, wherein the detection of the confirmation parameter includes a detection of a further activation intent.

4. The method of claim 2, wherein the detection of the confirmation parameter includes measuring a state parameter of a driver of the vehicle, the driver assistance system being activated as a function of the measured state parameter.

5. The method of claim 2, wherein the driver assistance system is not activated until a time interval between a particular point in time at which the activation intent has been detected and a particular point in time at which the confirmation parameter has been detected is less than a predefined time interval.

6. The method of claim 2, wherein at least one of the detecting of the activation intent and the detecting of the confirmation parameter includes a recognition of a voice command from a vehicle occupant.

7. The method claim 2, wherein at least one of the detecting of the activation intent and the detecting of the confirmation parameter includes a recognition of a gesture command from a vehicle occupant.

8. The method of claim 2, wherein the driver assistance system is not activated until the particular types of the detecting of the activation intent and the detecting of the confirmation parameter are different from one another.

9. A device for operating a driver assistance system of a vehicle, the driver assistance system being configured to autonomously safely park the vehicle when activated, comprising:
    a detection device to detect an activation intent for the driver assistance system; and
    a control system to activate the driver assistance system when the activation intent is detected.

10. The device of claim 9, wherein the detection device is also configured to detect a confirmation parameter, and wherein the control system is configured to activate the driver assistance system only when the activation intent as well as the confirmation parameter have been detected.

11. A vehicle, comprising:
    a driver assistance system; and
    a device for operating the driver assistance system, the driver assistance system being configured to autonomously safely park the vehicle when activated, including:
        a detection device to detect an activation intent for the driver assistance system; and
        a control system to activate the driver assistance system when the activation intent is detected.

12. A non-transitory computer-readable medium having a computer program, which is executable by a processor, comprising:
    a program code arrangement having program code for operating a driver assistance system of a vehicle, the driver assistance system being configured to autonomously safely park the vehicle when activated, by performing the following:
        detecting, while the vehicle is traveling, an activation intent for the driver assistance system;
        activating, after there is a detection, the driver assistance system; and
        autonomously safely parking the vehicle with the aid of the activated driver assistance system.

13. The computer-readable medium of claim 12, wherein the detection of the confirmation parameter includes a detection of a further activation intent.

14. The computer-readable medium of claim 12, wherein the detection of the confirmation parameter includes measuring a state parameter of a driver of the vehicle, the driver assistance system being activated as a function of the measured state parameter.

15. The computer-readable medium of claim 12, wherein the driver assistance system is not activated until a time interval between a particular point in time at which the activation intent has been detected and a particular point in time at which the confirmation parameter has been detected is less than a predefined time interval.

16. The computer-readable medium of claim 12, wherein at least one of the detecting of the activation intent and the detecting of the confirmation parameter includes a recognition of a voice command from a vehicle occupant.

17. The computer-readable medium of claim 12, wherein at least one of the detecting of the activation intent and the detecting of the confirmation parameter includes a recognition of a gesture command from a vehicle occupant.

18. The computer-readable medium of claim 12, wherein the driver assistance system is not activated until the particular types of the detecting of the activation intent and the detecting of the confirmation parameter are different from one another.

\* \* \* \* \*